United States Patent [19]
Garrison, deceased et al.

[11] Patent Number: 5,335,526
[45] Date of Patent: Aug. 9, 1994

[54] METHOD OF MANUFACTURING SUBSTRATES FOR MEMORY DISKS

[76] Inventors: Marvin C. Garrison, deceased, late of Colorado Springs, Colo.; by Eleanor Garrison, legal representative, 6979 Gayle Lyn La., Colorado Springs, Colo. 80919

[21] Appl. No.: 827,863

[22] Filed: Jan. 30, 1992

Related U.S. Application Data

[63] Continuation of Ser. No. 648,816, Jan. 29, 1991, abandoned.

[51] Int. Cl.⁵ .............................................. B21C 23/22
[52] U.S. Cl. ..................................... 72/47; 72/379.2; 72/364
[58] Field of Search .................. 72/46, 47, 379.2, 375, 72/376, 359, 364; 264/1.3, 107; 425/810; 360/135

[56] References Cited

U.S. PATENT DOCUMENTS

| | | | |
|---|---|---|---|
| 3,196,660 | 7/1965 | Olson | 72/376 |
| 3,761,333 | 9/1973 | Kleinbeck et al. | |
| 3,845,651 | 11/1974 | Vau | 72/332 |
| 3,886,052 | 5/1975 | Smith | 360/135 |
| 3,945,790 | 3/1976 | Puech | 264/107 |
| 4,349,499 | 9/1982 | Johnston | 264/107 |
| 4,376,963 | 3/1983 | Knoop et al. | |
| 4,520,647 | 6/1985 | Economy | 72/365 |
| 4,525,759 | 6/1985 | Valayil et al. | 360/135 |
| 4,552,820 | 11/1985 | Lin et al. | |
| 4,633,451 | 12/1986 | Ahn et al. | |
| 4,659,407 | 4/1987 | Lacotte et al. | 264/107 |
| 4,698,251 | 10/1987 | Fukuda | 428/64 |
| 4,711,115 | 12/1987 | Sukonnik et al. | 72/379.2 |
| 4,823,578 | 4/1989 | Coe et al. | 72/47 |
| 4,825,680 | 5/1989 | Coe et al. | 72/359 |
| 4,829,799 | 5/1989 | Coe et al. | 72/47 |
| 4,870,524 | 9/1989 | Coe | 360/135 |
| 4,887,179 | 12/1989 | Coe | 360/135 |

FOREIGN PATENT DOCUMENTS

| | | | |
|---|---|---|---|
| 0018125 | 7/1979 | Japan | 360/135 |
| 0053411 | 11/1983 | Japan | 72/46 |
| 0020486 | 2/1984 | Japan | 72/47 |
| 0158532 | 7/1987 | Japan | 72/379.2 |

OTHER PUBLICATIONS

Application of Electroforming to the Manufacture of Disk Records A. A. Max, Symposium on Electroforming ASTM Special Tech. Publ. #318 (1962).

J. R. Morrison, Disk Substrate Requirements for Future High Areal Densities Symposium on Magnetic Media Manufacturing Methods, Hawaii 1983.

A. W. Goldsteine et al. Structure of Chemically Deposited Nickel J. Electrochemical Society vol. 104, No. 2 pp. 104–110, see p. 108.

*Primary Examiner*—Lowell A. Larson
*Assistant Examiner*—Michael J. McKeon
*Attorney, Agent, or Firm*—John R. Ley

[57] ABSTRACT

A method for manufacturing rigid disk substrates wherein the conventional process is modified to include a hot press function performed at the end of the fabrication process. The hot press function is performed so as to produce a flat substrate by causing the blank to yield, avoiding flow of either the blank or its overlay coating. The hot press temperature is coordinated with subsequent user process thermal cycle to avoid annealing by that cycle. The platens of the hot press are renewable with exact replacement replicas of master surfaces exhibiting a precise texture pattern ranging from an exact character down to a visibly featureless surface. That precise texture is embossed into the surface of the overlay without modifying that surface's epitaxy character. The process is extended beyond what is normal, by providing compliant platens having replica faces for removing asparity defects from post memory film deposition surfaces, restoring the substrate surface character to the finished disk.

22 Claims, 9 Drawing Sheets

Fig_2

Fig_6

Fig_7

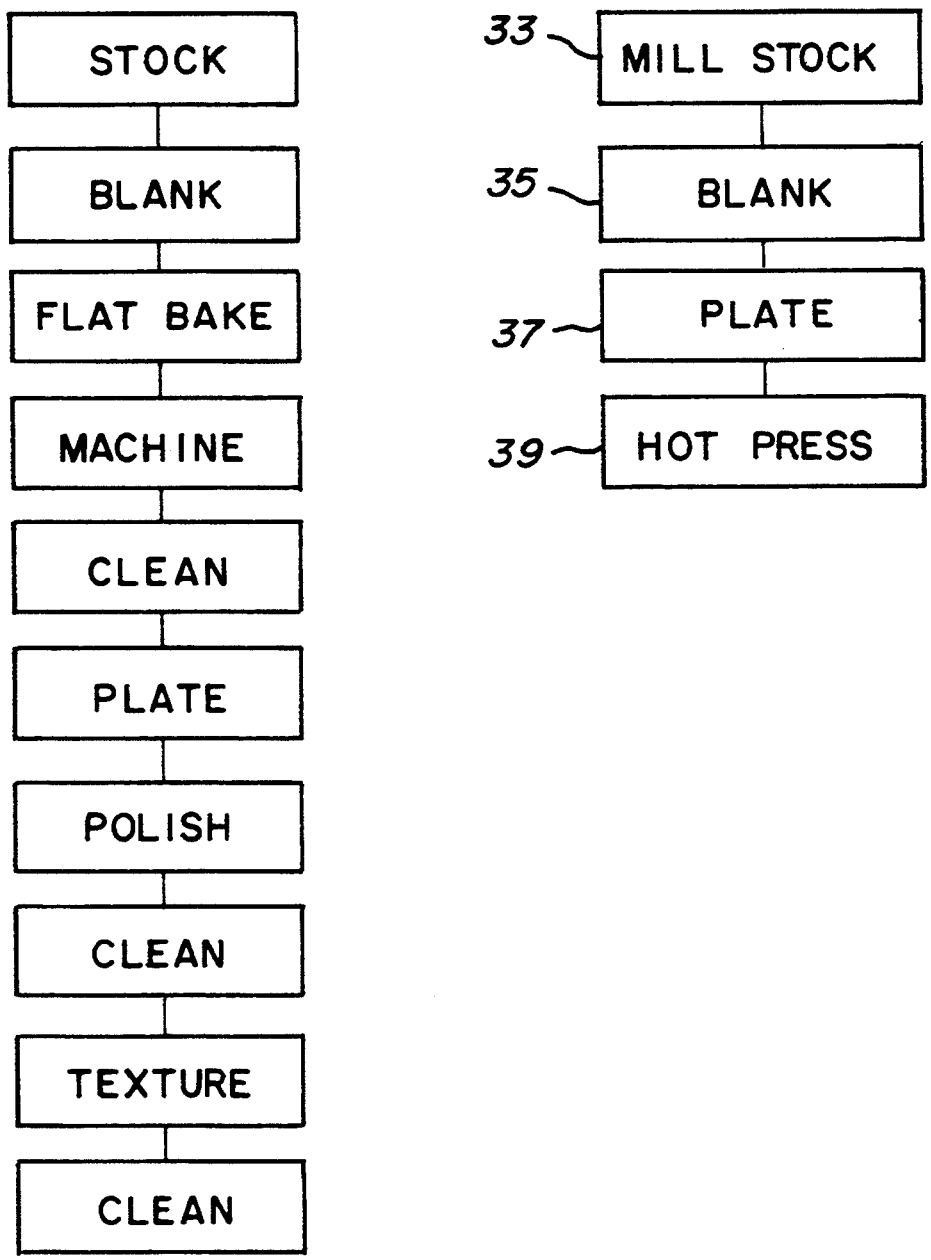
Fig_9

METHOD OF MANUFACTURING SUBSTRATES FOR MEMORY DISKS

This application is a continuation of copending patent application Ser. No. 07/648,816 filed Jan. 29, 1991 now abandoned.

BACKGROUND-FIELD OF INVENTION

This invention relates to improved manufacture of substrates for data storage media and more specifically to substrates for rigid disk storage media.

BACKGROUND OF THE INVENTION

The need for improved substrates for metallic thin film media in the data recording industry is discussed by Morrison et.al. in paper No. A-3 "Disk Substrate requirements for Future High Areal Densities" delivered at the Symposium on Magnetic Media Manufacturing Methods, Hawaii; May 1983. The conventional substrate process discussed there is: (1) forming an aluminum blank on a punch press, (2) flat baking to flatten, (3) turning on a lathe to machine to dimensions, (4) electroless nickel plate for a deposition surface, (5) polish to a mirror finish and finally (6) surface for proper head disk interaction. Most of the attention is directed to selection of the proper aluminum alloy. No remedies for many problems discussed by Morrison are presented.

A remedy for some of these ills, using the approach of a coining process where very high forces cause the blank material to flow across the surface of a coining die to produce the desired surface, is covered in a series of U.S. patents by Coe: U.S. Pat. Nos. 4,823,578 to Coe (1989), 4,825,680 to Coe (1989), 4,829,799 to Coe (1989), 4,870,524 to Coe (1989) and 4,887,179 to Coe (1989); hereafter referred to as "the series of patents to Coe." The commonality of these patents is a coining process that causes the blank material to flow, requiring a die ring to limit that flow. Various aspects and consequences of this coining process are revealed in the different patents. Not all of these consequences are beneficial. This series also discusses the shortcomings of the conventional process.

A failing of these discussions and remedies in the prior art is that the substrate is viewed as the end in itself. Thus the needs of the customer, the user of the substrate, are not fully considered. There are actually three entities involved: (1) the substrate manufacturer, (2) its customer the disk manufacturer who deposits recording films on the substrate and (3) the disk drive manufacturer who marries heads to the disk, reading and writing data. The prior art does not fully meet the needs of its customer, the disk manufacturer.

There are several needs of the customer that have gone unfulfilled by either the conventional or the coining processes. First, considering the vacuum deposition process of sputtering, in order to obtain the correct and desired magnetic properties in the sputtered recording film, the disk manufacturer heats the substrate before and during sputtering. The temperature selected is that deemed best for the process and varies between manufacturers. The heat cycle is often continued until the overcoat is deposited. While the temperatures vary between the various depositions it can be as high as over 300 degrees centigrade.

This prolonged time at elevated temperature is effectively a substrate annealing process. For a coined substrate, such as described in U.S. Pat. No. 4,887,179 to Coe (1989), whose dimensional stability is dependent on cold work stresses induced by the coining operation, such annealing can lead to dimensional changes anticipated by neither the disk manufacture or the substrate manufacturer. Thus this heat treatment can degrade the latter's efforts to provide "a super precise smooth surface."

A second unfulfilled need of the disk manufacturer is that for absolute uniformity of substrate surface structure for proper epitaxy in growth of the deposited recording film. This need is not met by poly-crystalline materials such as aluminum, brass, austenitic stainless steels, etc. The different crystal faces, presenting different crystal lattice spacing across the substrate surface, are not suitable for high recording density disks. For this reason the preferred surface is an amorphous one such as possessed by Ni—P and Ni—P—Cu, commonly known as electroless nickel.

While having the characteristics of being non-magnetic, these films, strictly speaking, are not completely amorphous. Goldenstine et al. in "Structure of Chemically Deposited Nickel" J. Electro. Chem. Soc. Vol. 104 #2 (1957) pp 104–110, describes etches to show the lamellar structure of cross sectioned films. Under the microscope this structure looks much like tree rings, and is believed to be due to slight oscillations in the amount of phosphorus deposited in the plate during the deposition.

When the nickel surface is polished in the conventional process these layers are polished through in a random fashion, due to the irregularities of that polishing process. Now if the surface were etched it would exhibit a pattern much like the grain of a board cut from a tree. To improve the recording film deposition, it is not uncommon for disk manufacturers to overlay this surface with nickel phosphorus (Ni—P) just prior to magnetic layer deposition. In electroplated processes this is an electroplated "nip" layer, and in sputtering it is physically deposited from the vapor state.

This problem is not alleviated in the coining process because that process forces a flow of the blank's material across the die thus disturbing the Ni—P surface. This flow is such a problem it causes build up on the die surface as discussed in U.S. Pat. No. 4,825,680 to Coe (1989) of the previously mentioned series. This is related to another need of the customer.

A fourth unfulfilled need of the disk manufacturer is that for absolutely identical substrates where the texture lines have identical "fingerprints." The conventional process using abrasives to produce random texture patterns, as exemplified in U.S. Pat. No. 4,698,251 to Fukuda (1987), does not produce identical patterns. It also has the disadvantage that some of the abrasive grains plow, rather than cut, the surface, raising ridges next to the texture line which interfere with head flight over the finished disk.

The series of patents to Coe, while claiming a texture pattern coined into the surface of the substrate, does not fulfill this need either. Unfortunately those patents do not reveal how the die surfaces receive the sub-micron ridges which it will coin into the surface as grooves. This mere invoking the idea without revealing how, makes that prior art difficult to assess. For instance, if the die is damaged, can it be replaced by one producing an identical pattern? Or does it mean that whatever specific pattern happens to be on a particular die will be reproduced during the life of that die? Even this latter loose definition is difficult to support in view of the revelation of U.S. Pat. No. 4,825,680 of that series to Coe.

Discussed there is the fact that the coining process suffers a gradual build up on the die, as a result of a transfer of material from the blank being coined to the die's surface. This occurs to such an extent so as to become visible to the eye within 2,000 impressions on a very smooth die. (This in a process making 6,000 impressions per hour.) The projecting ridges for texture purposes will exacerbate that situation. It is important to keep in mind the scale of this effect. To be of value to the user of the substrate, these texture lines must be sub-micron in depth and width. Yet this build up "at approximately 2,000 impressions" is sufficient to be visible to the eye. Thus, on the microscopic scale, long before this build up becomes visible to the eye, it will affect in a practical sense what is coined onto the surface. Stated another way, the character of the coined texture pattern will change as the operation continues. Thus from the user's standpoint the texture is not absolutely identical from one substrate to another, and the user's needs are not met.

There is another ramification of this. The transfer of material from the blank to the die, although not so defined in that patent, is called cold weld, wherein metal from one surface is transferred to another surface, becoming welded to the second surface. If extreme care is not taken in cleaning the die to remove this build up, the die will be degraded. Any fine scratches imparted to the die will be reproduced in subsequent cycles as ridges that interfere with head flight in the finished disk.

Concerning head flight over the disk, it is common to specify the flatness of memory disks in terms of the parameter acceleration. This form of the definition is in deference to the end user of the substrate, the disk drive manufacturer, who flies heads over the disk surface. From the perspective of the head, the surface of the disk appears to accelerate toward and away from the disk as undulations in the surface pass by. The head is limited as to how rapidly it can react to a changing undulation without striking the disk. Thus overall flatness is of importance to the customer.

U.S. Pat. No. 4,520,647 to Economy (1985) does not discuss this important parameter. It addresses the advantages of replacing the conventional processes' turning on a lathe and polishing, with polished rollers to impart a smooth surface to the substrate. Attention is given to surface finish on the micro scale, (all the figures being scanning electron micrographs), rather than finish and flatness on the macro scale, which is of importance to the customer. Thus, here also the customers needs are not fully met.

The present process is a radical departure from the conventional substrate manufacturing process. A less severe change can produce improved substrates while also meeting the aforementioned disk manufacturer's needs. An elaboration on the discussion of the conventional process, beyond that covered by Morrison and Coe, will make this clear to the reader.

In the conventional wisdom, the stock thickness fed to the blanking press is not critical, because "it is going to be machined to thickness." The inside and outside diameters of the blank is not critical, because "they are going to be machined to size." The chamfer is not included in the blanking, because "it will be added later." However all of these features of a substrate can be provided in the blanking process. Also because of this conventional wisdom, little consideration is given to the flat bake operation.

The flat bake heat treatment of the blank is performed by stacking blanks, applying a force to the stack, usually in the form of heavy weights, and baking at predetermined temperature and time. The temperature is high because of the relatively low loads of this method. Though not generally considered by conventional wisdom, this is also an embossing function. The embossed features are the joint effect of one blank's surface features against the adjacent blank's surface features. That wisdom views these surfaces as ones that will disappear or be discarded in the machining process and therefore the possible benefits of embossing is of no importance. However that wisdom does recognize the roll of embossing after baking, but considers it a nuisance.

In rhodium overcoated plated media it is important that the blanks be handled with care after flat baking. For instance, if the blanks are carelessly stacked with a grain of grit between disks, that grain will indent (emboss) the surface with its shape. This dent will be machined out and supposedly disappear. But subsequently, after being nickel plated, polished, textured and plated with magnetics and rhodium, the disk is baked to improve rhodium adhesion. At this point the stresses of the cold worked embossed grain are relieved raising an asperity in the disk. This and the stresses of coining are the hazards of cold working the substrate and later subjecting the disk to a thermal treatment relieving those stresses.

If the steps of the conventional process are rearranged and designed so that two or more operations are combined not only are process steps eliminated but the needs of the disk manufacturer can be more completely met.

Objects and Advantages

Therefore it is an objective of this invention to better utilize the conventional process' steps for manufacturing rigid disk substrates with the needs of the substrate's user in mind. This is accomplished by rearranging and combining these steps and turning to advantage aspects of the conventional process heretofore considered a nuisance. As will be seen this creates advantages unthought of in the prior art. As a result:

(a) One object and advantage is the utilization of the extraneous and discarded embossing function, that occurs early during flat bake, to produce useful surfaces on the substrate by delaying the application of said flat bake until the end of the process.

(b) Further advantage is made by inverting the temperature, pressure function in the conventional flat bake process, by utilizing higher pressure and lower temperature in a hot press operation. The flattening, here as in the conventional process, is accomplished by causing the substrate to yield, not flow.

(c) Another object of this invention is to gain advantage from this hot press operation by reducing the height of the substrate stack to a single disk, and confine it with the previously mentioned advantage of the salvaged embossing function.

(d) It is another object of this invention to gain further advantage from the hot press operation by coordinating its temperature with the temperature used by the customer so as not to mechanically work the substrate, at this final step, below the temperatures used by the customer in its fabrication process. An advantage here is that the customer will not inadvertently anneal away critical properties of the substrate.

(e) A further object of this invention is the avoidance of disrupting the nickel plate, on pre-coated substrates, providing the customer with a uniform surface upon which to deposit recording films.

(f) It is another object to make substrates with identical texture patterns by providing renewable platens. This advantage is further enhanced by incorporating these renewable platens into the hot press function. Thus with that function's consideration for the nickel plated surface, in not forcing it to flow, also preserves the integrity of the embossing platen's face. The feature of the renewable platen face provides the capability of replacing damaged embossing faces.

(g) It is a further object of this invention to provide a means of copying a customer's favorite texture patterns into the platen by replicating the master copy of that favorite texture pattern. The advantage here is that the master surface is preserved and its replicas, being both numerous and identical, assures that the same texture pattern can be maintained through out production runs. An archive of master surfaces also allows substrates in production runs to be tailored to individual customers.

(h) A further object of this invention is to allow combinations and parts of its process to be utilized in the conventional process, such as embossing identical texture patterns on polished surfaces, even though those surfaces may have a contour of their own character, differing from a flat surface.

(i) Another objective of this invention is to apply its techniques to the disk manufacturer's finished disk to eliminate asparities induced by that manufacturing process. By using a companion platen to true up the surface, the need for glide testing and burnishing can be eliminated, improving yields and reducing costs.

Other and further objects and advantages of the invention will become apparent as the specification progresses.

SUMMARY OF THE INVENTION

The foregoing objects can be accomplished by rearranging, adding, modifying, combining and deleting steps of the conventional process. In so doing the process is simplified to fewer steps. The process begins with the careful selection of the mill stock from which the blanks will be produced. This entails proper thickness, bright surface finish and the application of a protective parting agent.

In harmony with this selection, the blanking operation is conducted with care so as not to degrade the quality of the mill stock. That care includes blanking to the proper inside and outside diameters and application of the chamfer. The foregoing combines some of the tasks formerly assigned to a machining operation, thus combining some of the steps of the conventional process.

Because of the careful choice of mill stock, application of a protective agent and care during the blanking procedure, the blank can be sent directly to the plating operation, avoiding the cleaning required in the conventional process. Since the polishing step is also going to be avoided, only a minimum of nickel need be plated.

The protective parting agent is re-applied at the end of this plating step.

The conventional steps of flat bake, lathe turning, polishing and texturing are combined in the hot press operation. This also adds the feature of replaceable platens of replicated textures. The temperature, pressure and time of this hot press is selected to perform several functions. First to flatten substrate by causing the material to yield, not flow. Second, to emboss the desired surface texture with out disturbing the nickel surface. Third, to coordinate the temperature with the customers process needs such that the customers process does not anneal away desired properties of the substrate.

An additional feature of the process goes beyond what is normally thought of as part of the substrate manufacture's area of concern. That feature helps the customer alleviate his contribution to the failure of the finished disk. That contribution is the asperities induced to the disk by the memory film deposition process. The help is in the form of providing the customer with smoothed surfaced compliant platens between which finished disks are pressed, restoring the surface character to that of the substrate.

DRAWING FIGURES

FIG. 9 is a flow chart comparison of the conventional process and that of this invention.

DETAILED DESCRIPTION

The process of this invention is one of versatility to meet customer's needs. There are two important ramifications of this fact. First, terms used to describe the process and materials need to be defined. This is because various authors have used common terms differently. For instance, at what point do materials used in a process become a "substrate?"

Secondly, because this invention is in a field of rapid change, what may be the preferred embodiment of a versatile process today may be eclipsed in the future by one or more features considered of lesser importance today. Thus the preferred embodiment in what follows will be what most customers feel are important today. For instance, today most customers use non-magnetic substrates on which to deposit magnetic recording films. In the future this could change and a non-magnetic substrate become of lesser importance. For instance, in purely optical recording the requirement of a non-magnetic substrate is superfluous. Also, if the customer requires it, a sufficient thickness of non-magnetic plate can be applied to isolate the recording film from a magnetic blank material. Nonetheless, today most customers use non-magnetic substrates for depositing magnetic recording films.

Addressing that first ramification, the base material from which the main structure of the finished substrate is formed is here defined as "mill stock." Mill stock is that material which is delivered by a vendor from a production line in its mill. In this case it is in the form of sheet, coil, web etc. It can be ferrous, non-ferrous, plastic, etc., and either magnetic or non-magnetic.

A blank is a geometric form produced from the mill stock. While a substrate is the end product of the process, which is delivered to the customer. A disk is the finished product, the result of the customer depositing recording films on the substrate. Other terms will be defined as they arise in the discussion.

Attention is now turned to the preferred embodiment of the invention, i.e. those parameters of interest to most customers today. The process depicted in FIG. 9 begins with a procedure of selecting the proper mill stock (33) for the substrate blank. While any non-magnetic alloy can be selected, aluminum and its alloys are preferred because its low density yields a disk of low inertia desired by disk drive manufacturers. Among the aluminum alloys, pure aluminum or alloys clad, or overlaid, with pure aluminum are preferred to best integrate the process steps. The mill stock, of the proper thickness to match the finished disk parameters, can be either coiled or sheet stock. The surface finish should be as close to a specular finish as can be obtained. It is beneficial to call out stock with a strippable coating protecting that bright finish, as is common with clad stock. At any rate good practice dictates that all effort be made to protect the mill stock from damage and dirt.

Figure 1:
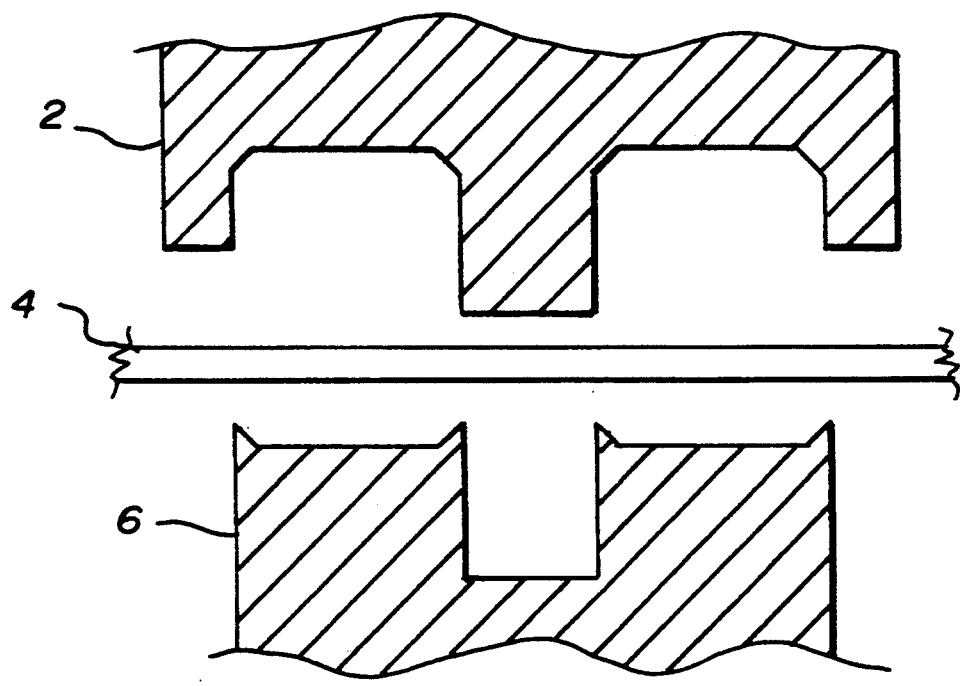
FIG. 1 is a sectional view of a blanking press.

BLANKING: The blanking operation (35) of FIG. 9 is depicted by a blanking press in FIG. 1. To maintain the bright finish of the mill stock (4) the faces of the dies (2 and 6) are a smooth polished surface so as not to degrade the finish of the mill stock. Unlike the conventional process the dies are sized so the plated blank will be the dimensions of the finished substrate. Also, counter to the conventional process, this blanking applies the proper chamfers. While the blank need not be flat after this operation it is obvious all effort should be directed to maintain flatness as best the process can. Any cold working stress induced at this stage will be corrected in the hot press operation to occur later.

In keeping with this invention's goal of combining and eliminating process steps, it is preferred that a parting agent be applied to the stock (4) prior to the blanking operation. When properly chosen a parting agent serves multiple objectives. First, it acts to prevent soils from adhering to the blank's surface. Secondly it acts as a lubricant during blanking and continues to protect the surface until it is removed in the nickel plating line. While a number of materials can serve this function, the preferred material is stearic acid or its salts. These compounds are soluble in a number of solvents including water. They are compatible with aluminum, stearic acid is a common lubricant used to roll aluminum foil. Stearic acid and its salts are components of common soap, and thus are compatible with soap solutions used for cleaning parts in nickel plating operations. Stearates are used as parting agents in mold releases aiding in separation of surfaces in molding operations. All of these properties are of use in this invention particularly because a coating of these materials on the blank cancels the need for a cleaning step after blanking. Thus, as the protective strippable coating is removed from the stock the surface is sprayed with a stearate solution which is allowed to dry. Alternatively this function is performed as the sheet is unpacked or as the coil unrolls.

As the blanks are removed from the blanking press they are placed in carriers that hold them in a position for automatic racking in the nickel plating process. Typically these carriers are of the type used in the semiconductor industry to hold silicon wailers and adopted by the disk manufacturing industry.

NICKEL PLATE: The nickel plating operation (37) of FIG. 9 is performed as follows. The blanks are received at the nickel plating operation and racked for plating. The common practice of racking the blanks so they will be completely plated with nickel is invoked here. The advantage is that this eliminates a bi-metal interface of aluminum and nickel, thus avoiding galvanic corrosion such as might occur in a coining operation, where the stock is pre-plated with nickel, and the aluminum exposed in the blanking step.

As stated before the stearate protective coating is removed in the electroless nickel pretreatment cleaner solution. The remainder of the pretreatment process is selected to minimize degradation of the blank's surface. The selection of pure aluminum is an aid here since there are no alloy constituents to be etched out. This is in contrast with the conventional process where the alloy selection is made for its machining rather than plating characteristics.

The blanks are plated a sufficient length of time to develop a bright plate. This is 10–15 minutes as opposed to the 100 minutes or more in the conventional process, which requires enough thickness to compensate for that removed by the polish step. Instead of the conventional process of rinsing and drying the nickel plate to present a clean surface for the next step, this invention re-applies the stearate protective coating preferably by a dip operation and the blanks are then packaged for delivery to the hot press operation.

Figure 2:
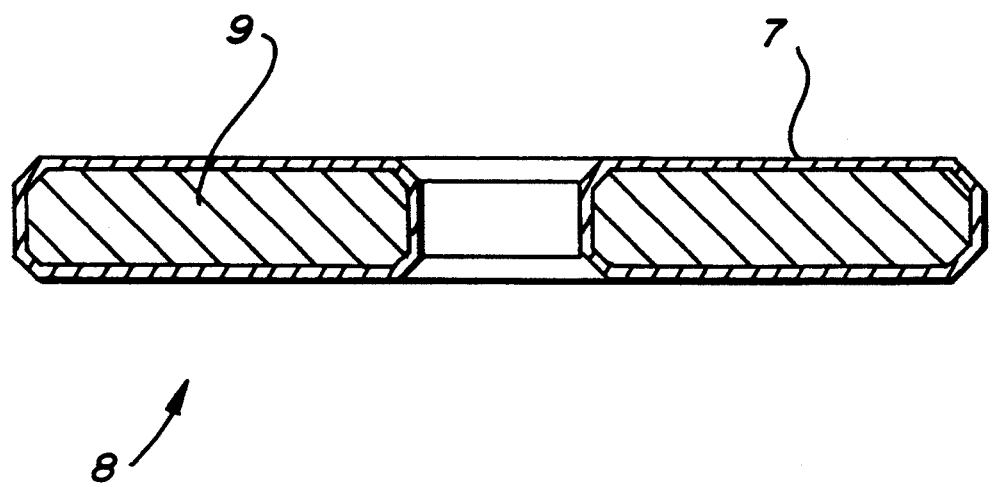
FIG. 2 is a sectional view of a plated blank.

The plated blank is depicted in FIG. 2. The nickel plate (7) completely covers the aluminum blank (9) to form the overlaid blank (8). In contrast with processes that pre-coat the stock prior to blanking, this present process precludes any galvanic corrosion at exposed aluminum nickel interfaces, because there is none.

Figure 3:
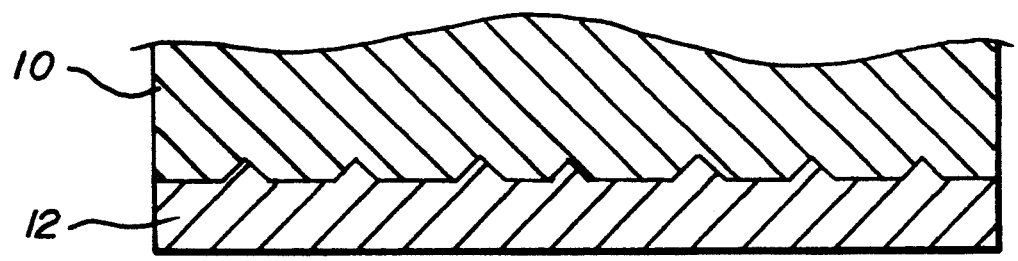
FIG. 3 is a representation of a master surface being replicated.

MASTER SURFACE: An object of this invention is to provide substrates with identical texture patterns from one substrate to another. This is accomplished by providing identical replacement platens (12) in the hot press operation. Referring to FIG. 3, these platens are replicated from a master surface (10), which can be a favorite surface of a particular customer. While the master surface can be of almost any material that can be replicated by electroforming, the preferred surface is that of electroless nickel since that is the common material of disk surfaces. Also the master surface need not necessarily be in the shape of a disk, however the preferred shape is that of a disk since that is the shape of the product.

The master surface can have a variety of surface characters varying from a deep texture to a smooth surface, i.e. a specific texture pattern ranging from a pronounced character down to a visibly featureless surface. The master surface can be generated in a number of ways. For instance a favorite surface that has been generated in the conventional texture process can be used. This surface may have been processed through to a finished disk by the disk manufacturer and undergone mechanical and electrical testing to have become a favorite disk. This disk can be reduced to its substrate by stripping its magnetic film and overcoat. One way to do this is to use a 50 percent nitric acid bath.

Alternatively a number of new and different texture patterns are possible with this invention that are difficult or impossible with the conventional process. For instance, instead of random and capricious patterns produced by current abrasive techniques, a carefully controlled pattern could be cut into the master surface. The techniques used to produce diffraction gratings come to mind. The advantage is that the texture line groove wall could be very uniform with a geometry tailored to the needs of a magnetic layer sputtering process.

Besides its shape the cutting tool can be controlled in a variety of other ways to produce grating like textures. It can be moved across the rotating master surface to produce a spiral groove of constant depth and pitch. Variations on depth and pitch could be included. Or the tool can be held at constant radius and lifted at each revolution to produce concentric circles with these variations. The tool holder can be mechanically modulated, possibly under computer control, to produce random spacings, depths, pitch and radii.

As is true of other methods to be discussed, separate texture patterns can be generated at different locations on the disk. Thus a texture advantageous to friction and wear for the head landing area can be laid down, while one beneficial to magnetic parameters applied to the head flight/data area. This advantage is difficult or impossible in the conventional texturing process.

It is an obvious advantage of this invention that considerable time and resources can be expended on construction of the master surface since the cost will be spread over the multitudes of replicas produced from that master.

Alternatively the master texture pattern can be produced by photo etch procedures. Here the pattern can be produced by human hand, holographic techniques, computer generation etc. An advantage here is that these patterns need not be limited to those generated by rotating surfaces as heretofore discussed.

It is obvious that this master surface can be that of a polished surface with no texture. Replicas of such a surface are of value in post recording film deposition processing, to remove defects generated during sputtering by the disk manufactured.

REPLICATION: Continuing to refer to FIG. 3, replication of a master surface (10) by the process of electroforming dates to the 19th century where it has been used to replicate art objects and for the last seventy years in the phonograph record industry to produce stampers for phonograph records. A review of this latter process is presented by A. M. Max "Applications of Electroforming to the Manufacture of Disk Records", in the "Symposium on Electroforming—Applications, Uses and Properties of Electroformed Metals" Dallas, Tex. February, 1962. ASTM Special Technical Publication No. 318. The texture lines of substrate technology are orders of magnitude finer than the grooves of phonograph records. A modification of that art using electroless forming is the preferred method of this invention. The replicas (12) of this invention are inverted copies of the master surface (10). An inverted copy is one where texture grooves are copied as ridges. This is illustrated in FIG. 3.

Electroless forming has several advantages in this application. First, facilities for electroless plating are already at hand. Second the plate can be hardened by heat treatment. For instance the as-plated film has a hardness of about 500 kg per square millimeter and by suitable baking process that value can be raised to 1100–1200 Kg per square millimeter. It is adaptable to the master surfaces (10) being contemplated.

The master surface (10) is passivated so that it can be overplated and yet that overplate not adhere to it. There are several techniques to passivate Ni—P surfaces. The preferred method is by reverse current cleaning the surface in an alkaline cleaner, as is common in plating shops. This is accomplished by cleaning the surface in the alkaline cleaner and then making the surface anodic by applying 6–12 volts between the surface and a cathode. The surface (10) is now passivated and ready for immersion in the electroless nickel solution. Again, referring to FIG. 3, the master surface (10) is left in the nickel plating solution until the replica (12) is thick enough to be handled.

Figure 4:
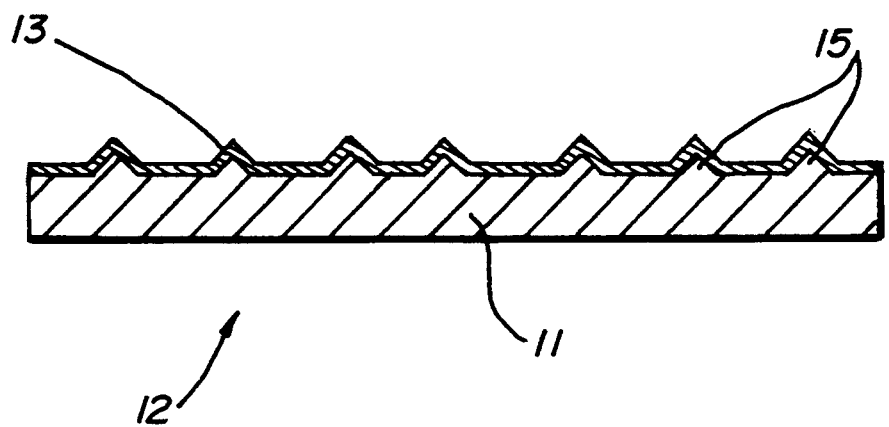
FIG. 4 is a representation of a stripped replica.

At this point the master replica combination (10 and 12) is removed from the plating bath and the replica (12) mechanically stripped from the master surface (10). This foil can be hardened at this point by baking and further surface hardened in a variety of ways. Chrome plating is a common method used to hard coat metals. Since plating processes are already in use in the process plating with a hard metal such as chromium or rhodium is the preferred method. At any rate the foil has the structure of FIG. 4, of the hard overlay (12) conforming to the surface character (15) in the nickel plate (13). At this point the nickel can be hardened by baking.

Figure 5:
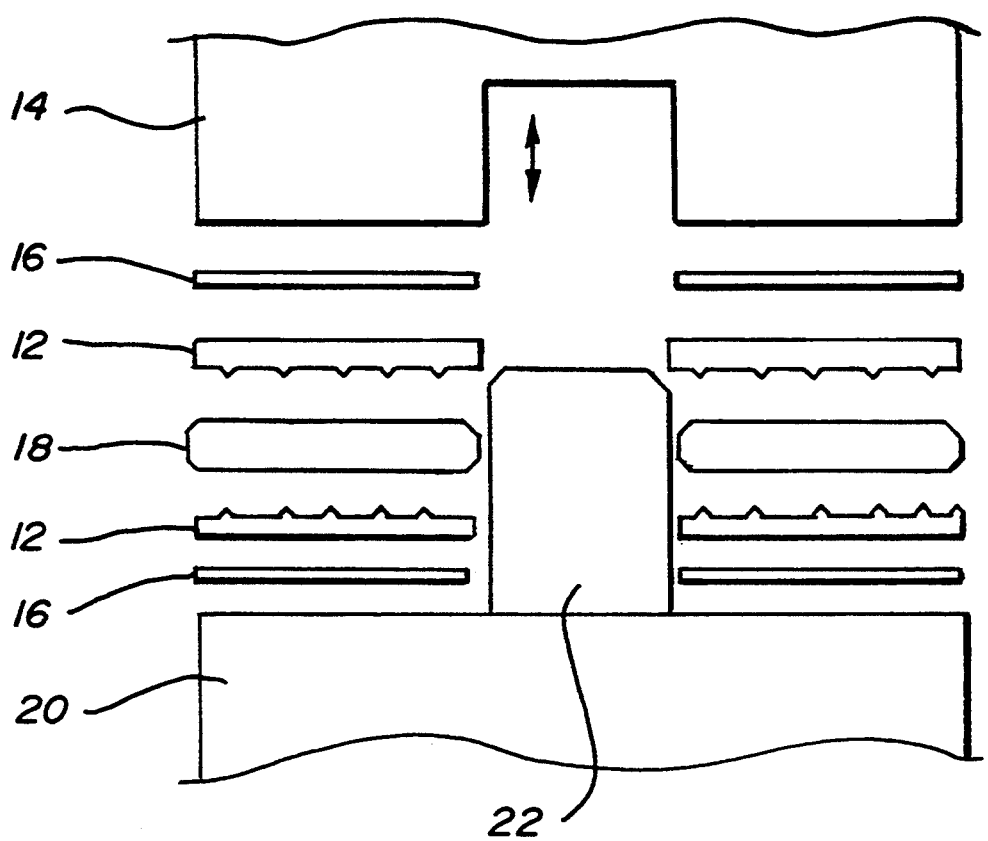
FIG. 5 is a sectional view of a replica mounting process.

MOUNTING: The foil can be mounted on the press platen in several ways. For instance a vacuum platen can be used to hold the foil in place. High temperature adhesives will bond the foil in place. The preferred method is to make use of the heated platens of the hot press and solder them in place. Referring to FIG. 5, the foils (12) are assembled to the upper and lower heated platens (14) and (20) by means of solder forms (16) as follows. Using the guide post (22) as a guide the components are stacked in the order: solder form (16), replica foil (12), set-up alignment disk (18), replica foil (12) and solder form (16). The upper platen (14) is lowered on to the stack and sufficient heat and pressure applied to solder the replicas to the platens. The selection of solder is governed by the temperature of the hot press operation, the solder's melting point being higher than the hot press temperature. Another advantage of using solder is that the assembly process is reversible for the removal and replacement of the replicas (12) when that becomes necessary. Also note that the mounting operation can be either performed on the hot press itself or removable platens can be assembled in a special jig performing the functions of the press.

HOT PRESSING: The hot press operation (39) of FIG. 9 combines several functions of the conventional process and is performed as follows: By leaving the flattening operation until this point machining has been avoided. Wider choice of aluminum alloys has allowed the selection of pure aluminum to avoid plating problems due to alloy and impurity constituents. The combination of temperature and pressure is modified to flatten the substrate. Instead of using low pressure and high temperature as in the conventional process, these are reversed and high pressure and lower temperature are used to cause the blank to yield to a flat state. This is also different than the coining process in that the substrate is not distorted, thus the inside and outside diameters and chamfers are maintained. Also of advantage here is the texture is embossed into the surface rather than the metal of the blank's surface being forced to flow across the replica, damaging the fine texture features.

Figure 6:
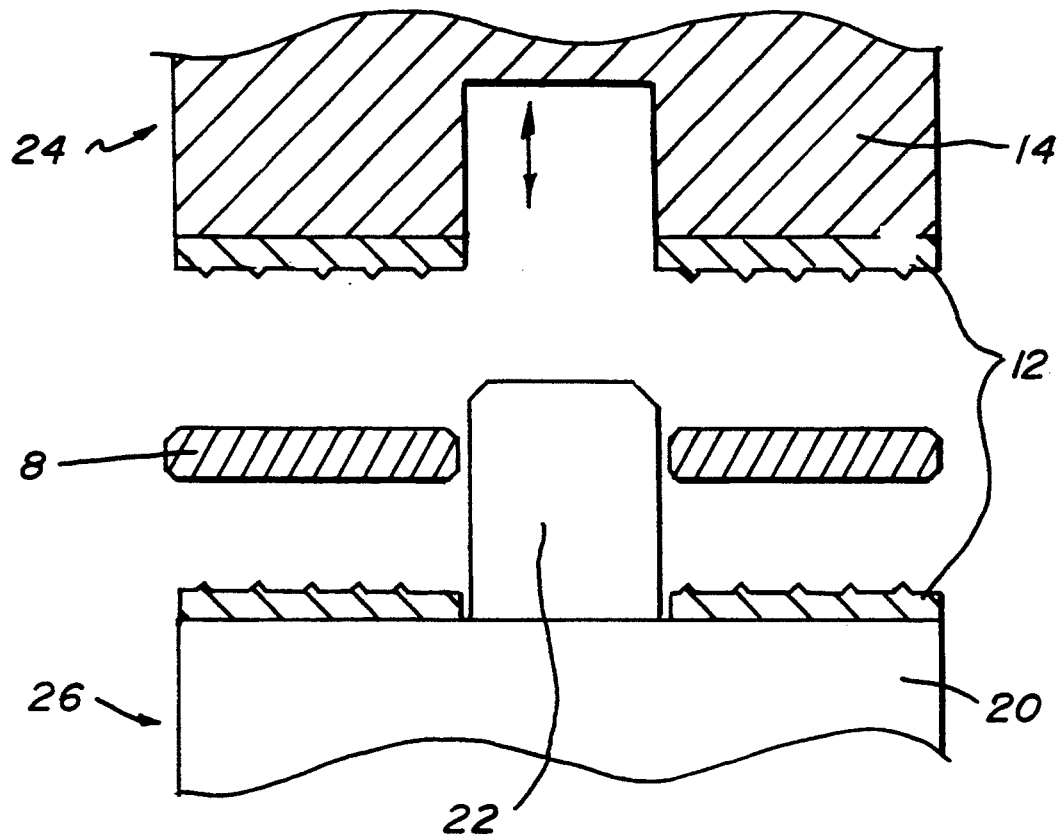
FIG. 6 is a representation of a hot press operation.
Figure 7:
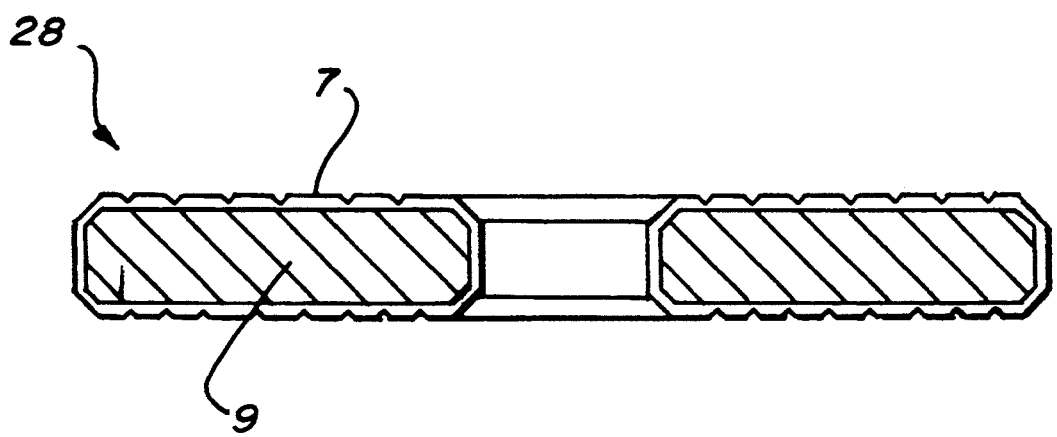
FIG. 7 is a sectional view of an embossed substrate.

Referring to FIG. 6, the blank (8) is loaded into the press over guide post (22) The blank is pressed between the platen/replica assemblies (14) and (20) at temperature, pressure and time determined by the condition the customer will use in its sputtering process. The resulting substrate (28) is depicted in FIG. 7.

ALTERNATIVE APPLICATION: An alternative application of this invention is to apply identical textures to substrates made by other processes. Using the conventional process as an example, the process is stopped after the polish cleaning step. Due to process variations, polishing techniques used by different substrate manufacturers produce various contours that differ from a flat surface. Even substrates from the same polishing process are not identical. For this reason the embossing foil needs to conform to an unspecified contour.

Figure 8:
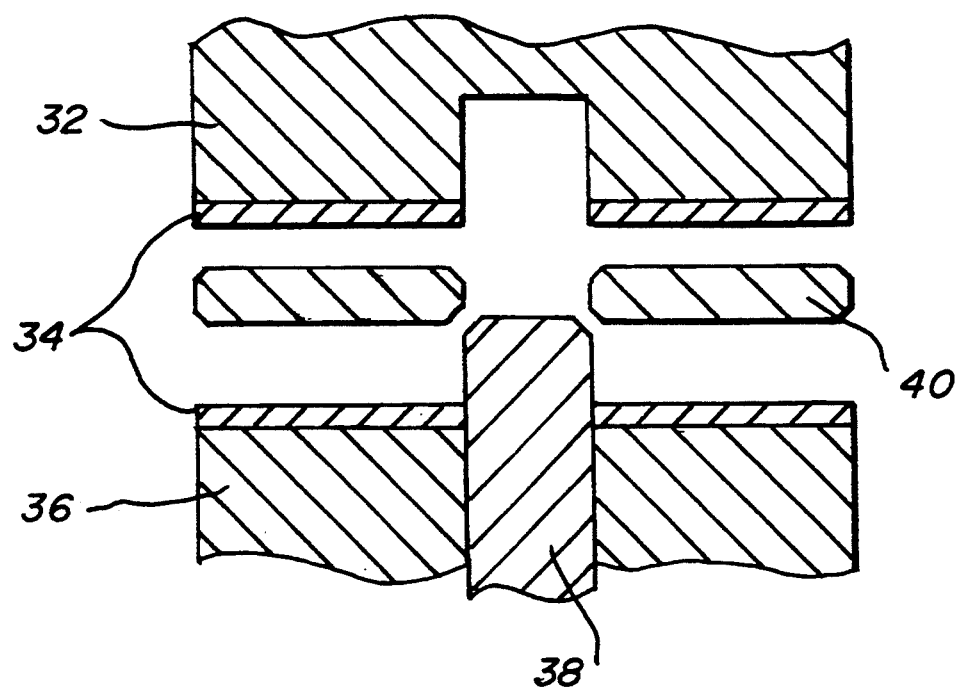
FIG. 8 is a sectional representation of a compliant platen press.

Such a conforming action is accomplished by the technique of FIG. 8. The face of the platens (32 and 36) is a resilient material, such as hard rubber, to which the replica foils (34) are bonded. There are a number of commercial adhesives suitable for bonding metals to rubbers and plastics. Since the conventional process, cited here as an example, has already produced its "flat" substrate the hot press flattening function is not invoked here. Rather, the resilient material allows the foil to conform the general contour of the substrate while the surface is embossed with the selected surface pattern of the foil. The foils are replicated from the master surface as before. The thickness of the foil is adjusted to the resiliency of the platen face the character of the pattern being embossed. Thus for a deep embossed pattern the foil would need to be thicker to provide local stiffness in the foil. As can be seen, this implementation of compliant platens can reproduce identical texture patterns on substrate surfaces produced by methods other than of this invention. There are other applications for compliant platens.

POST DISK PRODUCTION APPLICATION: This same technique can be applied to disks after recording films, overcoats, lubricants etc. have been deposited on the substrate by disk manufacturers. The function of this operation is the inverse of that heretofore discussed. Here it is used to flatten asperities rather than emboss grooves. Such asperities are induced by the disk manufacturer's operation.

In this application, and again referring to FIG. 8, the post production replica foils (34) with a smooth surface are bonded to the resilient platens (32 and 36). The finished disk is pressed between these platens and the pressure is adjusted high enough so that asperities are leveled but low enough the overall character of the disk surface is not changed.

This invention's use of a smooth compliant embossing platen to remove surface defects is different from U.S. Pat. No. 4,520,647 to Economy (1985) in two ways. This present invention applies the inverted embossing function to a finished disk whereas that patent teaches modification of the substrate. Second, this present invention levels asperities without modifying the surface containing the texture pattern where that patent affects the surface down to four microns which would obliterate the texture pattern.

IDENTIFICATION: There are several ways to identify substrates manufactured by the process of this invention. The identical texture fingerprint from one disk to another is one hallmark. Also the character of the chamfers, in that their individual markings do not uniformly line up with the embossed texture patterns, offer a means of identification, contrasting with an coining function where both features are coined at the same time.

Also metallurgical etching and examination of the lamellar structure will distinguish between polished, coined and the embossing of this invention. Polish will show as non-uniform removal of surface layers, coining will show surface flow and embossing of this invention will show a uniform surface layer structure.

From all of the above the reader can see that by rearranging some of the steps in the conventional substrate manufacturing process, modifying others and utilizing aspects of the process previously considered a nuisance, a process can be devised which greatly reduces the cost of disks and more fully meets the customer's needs.

While the above description contains many specificities these should not be construed as limitations on the scope of the invention, but rather as an exemplification of one preferred embodiment thereof. Many other variations are possible. For example, in the replication process the hard metal overlay can be first plated onto the passivated master surface, then the Ni—P plated over that layer. When this composite is stripped it has the same structure of FIG. 4. Alternatively the Ni—P replica can be stripped and the hard overlay produced by nitriding. Again the foil would have the same structure as before. The same effect can be obtained by constructing the replica foil with a plurality of other layers without changing its intended purpose.

Also the techniques of the "Post Disk Production Application" can remove asparities induced in substrates formed by other manufacturing methods. For instance the defects of abrasive cut texture patterns. Again an embossing function is taking the place of the machining operation of a burnish head conventionally used by disk manufacturers for removing asparities.

Accordingly, the scope of the invention should be determined, not by the embodiments illustrated, but by the appended claims and their legal equivalents.

What is claimed is:

1. A method of manufacturing a substrate for a memory disk from a metal blank, the substrate having at least one surface for attaching a recording medium over which recording heads will slide and fly during use of the memory disk, said method comprising:

pressing the metal blank between a pair of platen faces, at least one of the platen faces containing a replica of a surface texture pattern to be formed on the substrate, heating the substrate to a predetermined temperature while pressing the substrate between the platen faces to cause the metal of the blank to yield without flowing to take a permanent set and to acquire a flat contour, and while at the same time applying a predetermined pressure by pressing the substrate between the platen faces to emboss a surface texture pattern from the face of the one platen onto the surface of the substrate, said predetermined pressure and said predetermined temperature being insufficient to create cold flow of the metal of the blank, and selecting said predetermined temperature to prevent relief of any cold work stresses in the metal of the blank that remain after the flat contour and the embossed surface texture have been created from pressing, when the substrate is later heated to a temperature less than the predetermined temperature during a subsequent application of a data recording medium to the surface of the substrate.

2. A method of manufacturing a substrate for a memory disk which does not promote the creation of asperities and changes in substrate shape when heating the substrate during a subsequent application of a data recording medium to the substrate, comprising:
   forming a blank for the substrate from metal mill stock;
   attaching to a surface of the blank an overlay of material upon which to receive a surface texture upon which the data recording medium is to be subsequently applied;
   heating the attached overlay to a predetermined temperature; and while the overlay is heated to the predetermined temperature
   pressing against the heated overlay to flatten the substrate by yield and not flow of the metal of the substrate, and simultaneously
   embossing in the heated overlay a predetermined surface texture by causing the material of the overlay to yield without flow of the overlay material across the surface of the blank;
   selecting the predetermined temperature at which the pressing and embossing steps occur to be greater than the temperature to which the overlay will be heated during the subsequent application of the data recording medium to the surface texture; and
   selecting the predetermined temperature to inhibit the formation of asperities in the surface texture and inhibit changes in substrate shape from the relief of cold worked stresses in the substrate at the temperature to which the overlay is subjected during the application of the data recording medium.

3. A method as defined in claim 2 further comprising:
   chamfering the blank simultaneously with the step of forming the blank.

4. A method as defined in claim 2 wherein the mill stock is a first metal and the material of the overlay is a second metal and wherein:
   the step of applying the overlay is performed by plating the blank with the second metal.

5. A method as defined in claim 4 wherein the first metal is substantially pure aluminum.

6. A method as defined in claim 4 wherein the second metal is nickel.

7. A method as defined in claim 6 wherein the plating of the blank is performed by electroless nickel plating.

8. A method as defined in claim 2 wherein the heating step further comprises:
   heating the blank and the attached overlay until the metal of the blank and the material of the overlay reaches the predetermined temperature.

9. A method as defined in claim 2 applied to each of a plurality of substrates and wherein the predetermined surface texture embossed in each of the plurality of substrates is substantially identical.

10. A method as defined in claim 2 further comprising:
    forming at least one master having a surface texture which is substantially identical to the predetermined surface texture for the substrate; and
    producing a replica which is an inverted copy of the surface texture of the master; and wherein the step of embossing the overlay further comprises:
    placing the replica against the overlay;
    applying the predetermined pressure to the replica to press the replica into the overlay and emboss the predetermined surface texture in the overlay as a duplication of the master surface texture on the overlay by yielding the overlay material without substantial flowing of the overlay material.

11. A method as defined in claim 10 wherein the step of producing the replica further comprises:
    forming the replica on the surface texture of the master;
    stripping the replica from the master; and
    hardening the replica prior to pressing the replica against the overlay.

12. A method as defined in claim 11 wherein the step of forming the replica further comprises:
    passivating a surface of the master upon which the surface texture is located; and
    electroless nickel plating the surface of the master upon which the surface texture is located to form the replica.

13. A method as defined in claim 11 wherein the step of hardening the replica further comprises:
    heating the replica; and
    plating the replica with a hard metal.

14. A method as defined in claim 13 wherein the hard metal is one of chromium or rhodium.

15. A method as defined in claim 10 wherein the pressing and embossing steps are performed in a press having at least one platen, and said method further comprises detachably attaching one of the replicas to the platen.

16. A method as defined in claim 15 wherein the step of detachably attaching the replica to the platen further comprises:
    placing a solder foil having a predetermined melting temperature between the platen and the replica;
    selecting the predetermined melting temperature of the solder foil to be greater than the predetermined temperature to which the overlay is heated; and
    heating the solder foil to the predetermined melting temperature to melt the solder foil and attach the replica to the platen.

17. A method as defined in claim 2 wherein the data recording medium is a magnetic data recording medium.

18. A method as defined in claim 2 wherein the step of forming a blank further comprises forming the blank in substantially the same size and form as the completed substrate.

19. A method as defined in claim 2 wherein the step of attaching the overlay further comprises attaching initially to a surface of the blank the overlay of approximately the same final thickness of the overlay of the completed substrate.

20. A method of applying a surface texture to a surface of a data disk substrate upon which a data recording medium is to be subsequently applied, said method inhibiting the creation of asperities in the surface from heating the substrate during the subsequent application of the data recording medium to the substrate, comprising:
    heating the substrate to a predetermined temperature;
    embossing the heated substrate with a pattern to create a predetermined surface texture on the substrate by causing the material of the substrate to yield without flow of the material of the substrate across the surface of the substrate;

selecting the predetermined temperature at which the embossing step occurs to be greater than the temperature to which the substrate will be subjected during the subsequent application of the data recording medium to the substrate; and selecting the predetermined temperature to inhibit the formation of asperities in the surface texture from the relief of cold worked stresses in the substrate at the temperature to which the substrate will be subjected during the application of the data recording medium.

21. A method of applying a predetermined surface texture to a surface of a data disk substrate upon which a data recording medium is applied, comprising:

using a press having at least one platen having a face;

producing a replica which is an inverted copy of the predetermined surface texture;

resiliently attaching the replica to the face by a resilient backing;

pressing the replica against the surface of the substrate with a predetermined pressure to conform the replica to the contour of the surface of the data disk, while simultaneously embossing the surface of the substrate with a predetermined surface texture from the replica by yielding the material of the substrate without flowing the material across the surface of the substrate;

heating the substrate to a predetermined temperature during embossing the surface;

selecting the predetermined temperature at which the embossing step occurs to be greater than the temperature to which the substrate will be subjected during the subsequent application of the data recording medium to the substrate; and selecting the predetermined temperature to inhibit the formation of asperities in the surface texture from the relief of cold worked stresses in the substrate at the temperature to which the substrate will be subjected during the application of the data recording medium.

22. A method as defined in claim 21 further comprising:

forming at least one master having a surface texture which defines the predetermined surface texture for the substrate; and forming the replica on the master prior to attaching the replica to the platen face.

* * * * *